A. SCHRENKEISEN.
GLOBE.
APPLICATION FILED DEC. 11, 1918.
1,335,923.
Patented Apr. 6, 1920.
3 SHEETS—SHEET 3.
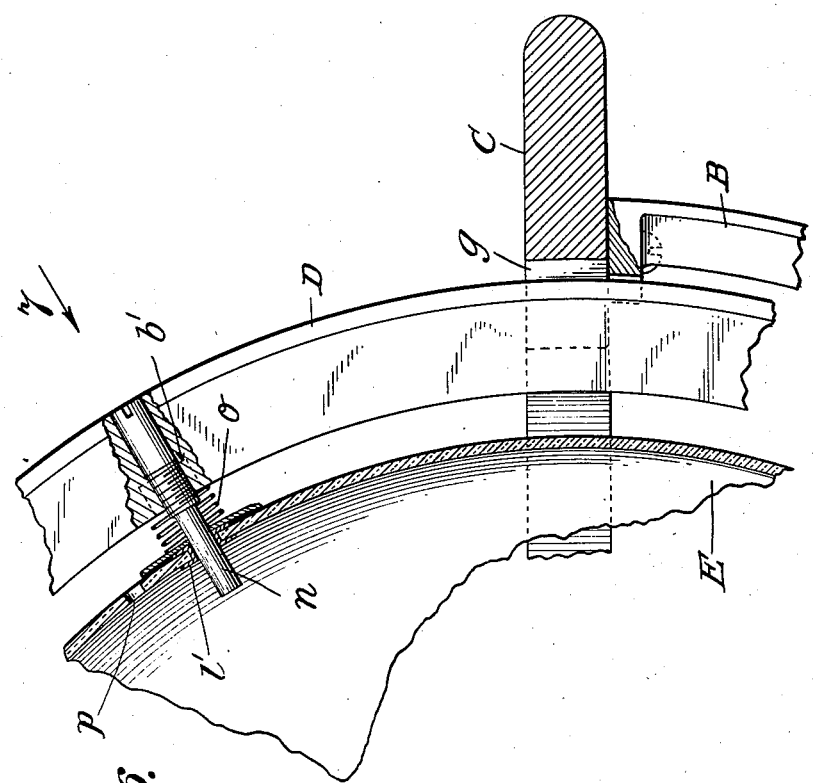
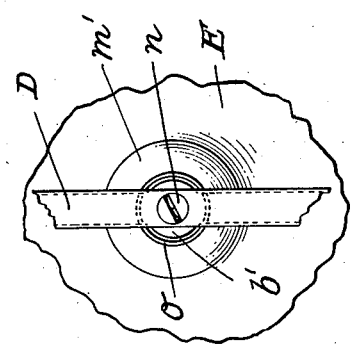
Witnesses:
Inventor
Arthur Schrenkeisen
By his Attorney

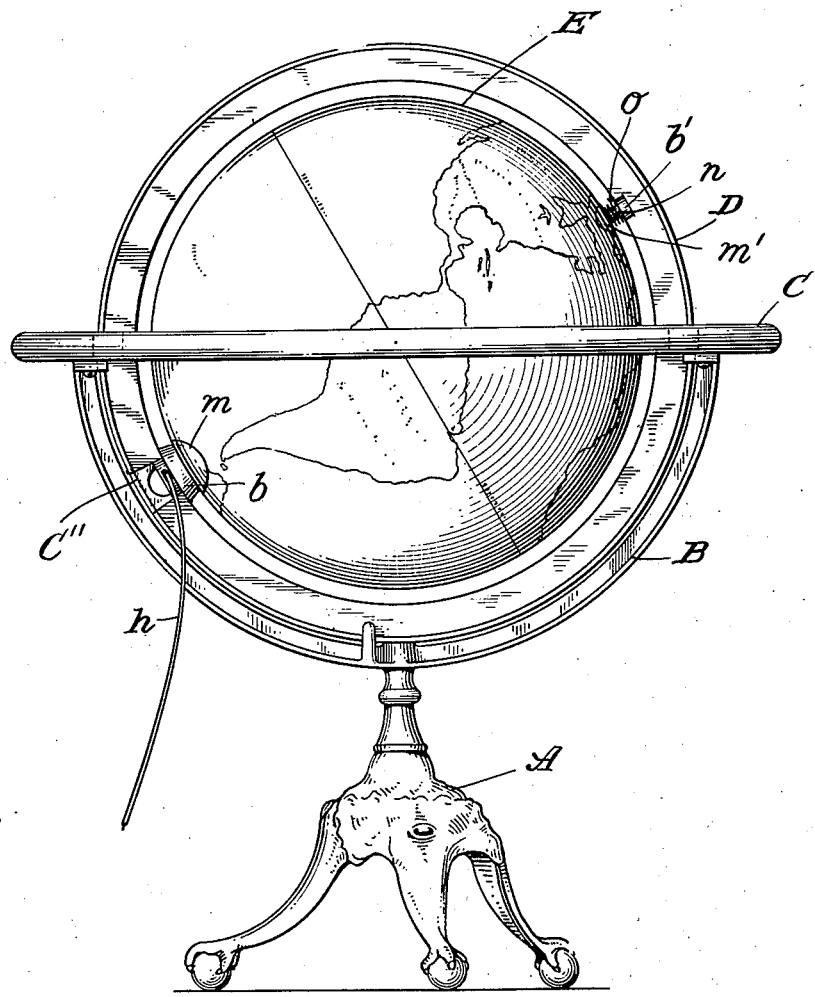

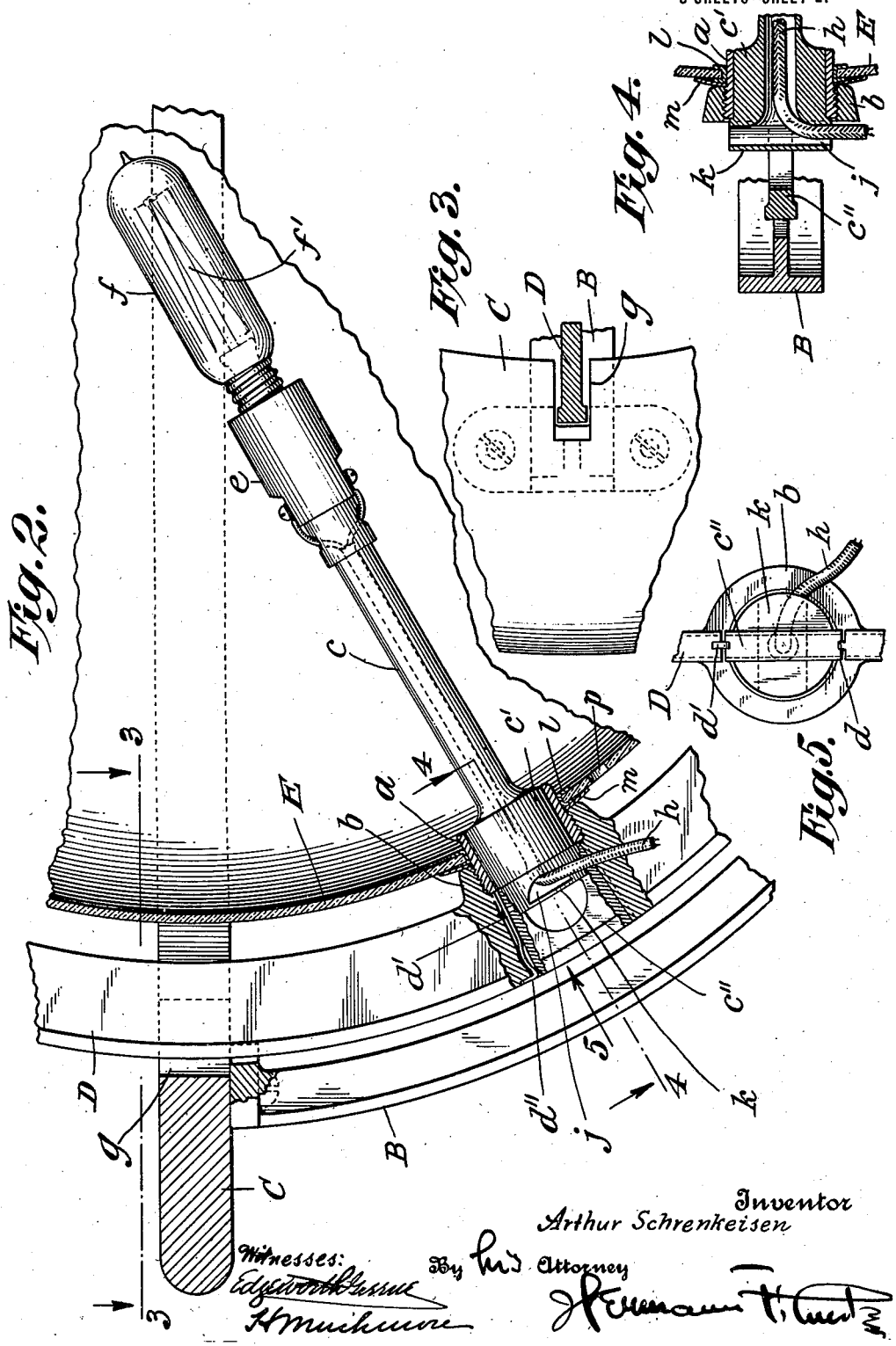

UNITED STATES PATENT OFFICE.

ARTHUR SCHRENKEISEN, OF NEW YORK, N. Y.

GLOBE.

1,335,923.  Specification of Letters Patent.  Patented Apr. 6, 1920.

Application filed December 11, 1918. Serial No. 266,205.

*To all whom it may concern:*

Be it known that I, ARTHUR SCHRENKEISEN, a citizen of the United States, residing in the city, county, and State of New York, have invented certain new and useful Improvements in Globes, of which the following is a specification, reference being had to the accompanying drawings, illustrative of one particular embodiment of my invention.

This invention relates to globes such as serve to illustrate the earth, and among the particular objects of my invention are the construction of such devices in a manner that will greatly facilitate the observation, study and inspection thereof and serve in various ways to enhance the value of their use, while in a measure adding to their general indirect usefulness, without in any way detracting from the known advantages of their construction.

In particular I provide for an internal illumination of a globe in a manner which insures the freedom of movement and manipulation, but which serves to make possible observation of all details and minute markings and lettering which is otherwise difficult or impractical, and which therefore in the ordinary globe circumscribes the utility for which they are intended.

In the particular form of embodiment which I have herewith illustrated and will now describe in detail, I refer to a globe made of translucent shell, such as glass, with the map of a suitable semi-translucent material covering the shell, and a light centrally located within the shell but connected by means permitting ready removal for adjustment, replacement or repair and with connections for the attachment of the light which insures the avoidance of any interference with the rotation of the globe or the polar adjustment of the same for instruction or observation. With this I provide adequate means for the assembly of the globe, such as a glass globe and its proper support in view of the character of the material and the construction necessary for the internal light.

In the particular embodiment of my invention which I have shown in the accompanying drawings:

Figure 1 is an elevation of a terrestrial globe with movable meridian containing the invention.

Fig. 2 is a fragmentary view of a portion of a globe, part in section, showing the mounting of the light support on the meridian ring.

Fig. 3 is a horizontal section of a portion of the meridian ring and adjacent globe side on line 3—3, Fig. 2.

Fig. 4 is a fragmentary section on the axis of the light support of the line 4—4 of Fig. 2.

Fig. 5 is an end view in the direction of the arrow 5, Fig. 2.

Fig. 6 is a fragmentary section of the meridian ring and adjacent globe portion at the complementary pole support from the light support.

Fig. 7 is an end view of the support shown in Fig. 6 as seen from the direction of arrow 7, Fig. 6.

In Fig. 1, A is a base, B is a globe supporting segment with a horizontal frame C, all in the usual manner, adapted to carry the meridian ring D so as to support and permit rotary adjustment of the same with globe E pivotally supported within the meridian ring D.

The globe E, as shown in the particular form of embodiment of my invention, is translucent glass and the support therefor is provided at one pole by the ring pin $a$ screwed into a boss $b$ fashioned on the meridian D. A light fixture $c$ has a relatively larger cylindrical base $c'$, adapted to a close supporting fit within the ring $a$ and said fixture terminates in a flattened end $c''$ of approximately the same thickness of a section of the meridian ring D. The flattened end $c''$ has a positioning groove $d$ at one side and a snap catch $d'$ at the other side terminating in a finger engaging release projection $d''$.

The light fixture comprises the rod carrying wires in any usual way to a suitable end socket $e$ into which is screwed an elongated bulb $f$. The bulb is so arranged that the center or focus of light $f'$ coincides substantially with the center of the globe.

As shown in Fig. 3, the frame member C is recessed at $g$ to form a track support for the meridian ring D. In Fig. 4 a fragmentary section shows the fixture in $c'$ in the pivot ring $a$ and the flattened end $c''$ in its relation to the supporting frame B; and illustrates the wiring $h$ passing through the hollow fixture rod and passing through a lateral aperture $j$ with the protecting member $k$ of the fixture support adapted to hold the wire in position, for purposes which will hereinafter appear. The ring *a* passes through an opening in the globe E, the edges of which opening are surrounded by a ferrule 1, and outside of said ferrule a washer *m* covers the adjacent part and forms a bearing for the globe between the glass and the meridian boss *b*.

On the opposite or complementary pole support of the globe a pivot *n* projects axially into the glass through an orifice, the edges of which are protected by a ferrule *l'*, while the outer adjacent surface of the globe carries a washer *m'*, which is engaged by a spring *o* surrounding the pivot *n*, exerting a pressure between the washer and a boss *b'* on the meridian ring, in order to prevent lost motion of the globe within its pivotal supports. The pin *n* is supported in the meridian D by passing through a hole in the meridian, the meridian being enlarged at this point by the boss *b'*, which is internally threaded so as to secure the pivot *n* against removal. In the shell of the globe, preferably near each pivotal support, are ventilating holes *p—p*.

It will thus be seen that the globe having the usual legs or base, with supports to carry the meridian ring, is distinguished from former constructions by having the globe proper E, made of translucent material, in the preferred form milk glass, with thin map paper secured to the outer surface which may have all of the finest markings and lettering desired for perfection in detail and elaboration. The securing of the map or printed surfacing requires suitable cement and lacquer in order to have permanency and durability, owing to the heating of the interior necessarily incident to the internal light. Special investigation has resulted in suitable means to provide for this.

Preferably at one pole of the globe a hole of suitable size is provided in the translucent shell, into which a thimble pivot *a* is inserted by screwing the same into a boss *b* of the meridian ring, thereby supporting the globe for rotation, which is furthermore advantageously provided by having the ferrule in the about the engaging edge of the hole in the globe and a metal washer outside to provide a suitable bearing. On the diametrically opposite pole of the globe a pivot *n* is provided, which preferably must be inserted radially from outside, because the fragile character of the globe, when glass is used, prevents the distortion or cramping of the globe over any fixed pivot. This pivot *n* is so inserted in the meridian ring as to be fixed and give a firm axial support for rotation of the globe and is surrounded by a spring *o*, which engaging the meridian ring and a washer on the globe insures a pressure which keeps the globe at the opposite pole secure upon its pivot thimble *a*. Orifices *p—p* are provided preferably adjacent to the poles where they do not interfere with the surface delineations, which afford a ventilation of the globe so as to prevent the heat of the light from causing any extreme temperature.

The pivot thimble *a* is made of a size permitting the insertion of an electric light fixture, which, as shown and above described, is inserted from the outside and has a secure bearing at its base *c'*, to retain it rigid, while its rotary position is maintained by engagement of its flattened end *c"* with the meridian ring and the clip *d'* secures it against accidental removal and permits ready displacement when desired. Beyond the base of the fixture *c*, the end socket and the incandescent bulb *f* are sufficiently smaller, to permit the insertion of the entire electric fixture. The size and arrangement is such as to bring substantially the focus *f'* of the electric light in the center of the sphere so that light is quickly diffused to illuminate the entire surface of the globe. A slight shadow from the socket is only such in the neighborhood of one of the poles where there is little or no chance of detail requiring minute observation.

If desired the incandescent bulb is made with a semi-cylindrical shade so as to cause a shadow over half of the globe to simulate night, while the other half is illustrated to simulate day. But if such arrangement is used a means of adjustment is employed in order that the day and night zones may be suitably varied or the light may be removed and the adjustment made for that purpose. Likewise such a shade may be adapted for angularity with respect to the axis of the bulb, in order that the night and day simulations may be made to approximate the seasons it is desired to illustrate or observe.

In order that the rotation of the globe may be free and the adjustment of the meridian may be made at will, the wiring connections to the electric staff or fixture *c* are diverted abruptly at the base to a lateral exit, with a guard as *k*, which hold them in place and protect them against abrasion which otherwise would result by frequent adjustment of the meridian in the frame C.

In this manner an outside source of current, as a connection with a house circuit or a storage battery fixed or in the base of the globe support, serves to supply current with the advantageous connection as above described to meet all the conditions of use.

The socket or lamp connections being made at one of the poles means all the conditions of construction and use most advantageous.

The construction, it will be seen, serves most admirably to illuminate the superposed map with the globe and to facilitate reading to such an extent that the use of the globe is greatly increased and reference made thereto when other globes as heretofore made would not be referred to owing to inconvenience or difficulty of observation. In addition thereto, the usual use of such devices in libraries, schools or elsewhere, is greatly enhanced by the fact that the globe lighting affords a semi-illumination, so that the otherwise infrequently used globe becomes an ornament in a room, attracts attention and leads to investigation and interest that would not otherwise be initiated or stimulated.

Various other forms of globes may be constructed embodying my invention. Modifications may be made in various respects from the particular form herein shown and described in detail, without departing from my invention, and what I claim and desire to secure by Letters Patent is:

1. In combination with a globe, an internal removable light, an internal source of energy for said light, an adjustable carrying frame for said globe and a support for said carrying frame, a pivotal connection between the globe and its carrying frame, a removable light fixture adapted to be inserted through said pivotal support and to be securely held in said pivotal support and removable therefrom without removal of the globe from said support.

2. A globe of the character described, having a meridian ring to rotatably support the globe, an enlargement at one point in said meridian to support a globe pivot and an opening therethrough to admit the insertion of an internal light fixture and means on said fixture engaging said meridian ring to replace the cut away portion of the meridian and form therewith a continuous ring track.

3. In a globe comprising translucent shell material, diametrically opposed supports for said globes, a hollow pivotal connection at one support, a light adapted to pass through said hollow pivotal support and a fixture for said light detachably engaging and supported by said hollow pivotal support, electric wire connections from an outside source leading to said fixture support, and connections therewith permitting freedom of rotation of the globe.

4. A terrestrial globe comprising a shell with superposed map surfacing, an internal electric light within said globe, a hollow pivotal support for said globe, a support for said light detachably carried by said pivot of the globe and adapted for insertion and removal therethrough without displacement of the globe from its pivotal support.

5. A globe comprising a translucent shell and superposed cartographical delineations, a meridian ring, a support to adjustably carry said meridian ring, polar or complementary pivotal supports on the meridian for the globe, an electric light fixture adapted to pass through one of said supports and removable therefrom, without interference with the support of the globe, and current connections from an outside source of electricity leading through said pivotal support and secured by means whereby full freedom of adjustment of the meridian is permitted.

6. An internally illuminated globe including a translucent shell, an internal light, a fixture to removably support said light within the shell, an aperture in said shell of greater diameter than the light and its fixture, whereby axial insertion of the fixture and light is permitted through the aperture, a reinforcing and bearing member about the edge of the aperture in the shell, a second pivotal support and yielding means associated therewith, whereby the shell is held upon its pivots against jar and accidental displacement.

7. An internally illuminated globe having a shell with surface delineations constituting a semi-transparent whole, an internal electric light, a fixture therefor, a pivotal support for the globe, an aperture in said globe and through said pivotal support adapted for the insertion and removal of said light fixture, and having a bearing adapted to support said fixture for ready attachment and detachment without removing the globe from said support, an external source of current and connections with said fixture exterior to said globe, permitting the removal and insertion of the light without displacement of the globe from its support.

8. An internally illuminated globe having supports on opposite sides permitting the rotation of the globe on an axis, and an internal source of light and means for carrying the same by insertion through one of said supports while the globe remains on the support, ventilating means apart from the supports at opposite sides of the globe.

9. An internally illuminated globe having a meridian frame, supports fixed to said frame and pivotally holding the globe at the north and south poles, an aperture through the south pole support and an electric light fixture adapted to pass through and to close said aperture when in position, a yielding member at the north pole support permitting limited movement for the insertion of the globe on the opposite support.

10. An internally illuminated globe comprising a glass shell, an internal light fixture adapted to be inserted through an aperture at one pole of said globe, a fixed pivotal support surrounding said light fixture aperture and a supporting bushing engaging the glass at said aperture and permitting limited movement for insertion, a pivotal support diametrically opposite to said aperture and a spring coöperating therewith to hold said shell in a predetermined position at the opposite pivot.

11. An internally illuminated globe having supports at diametrically opposite sides permitting rotation of the globe on an axis, an internal source of light and carrying means therefor adapted to be inserted through one of said supports having an aperture for said insertion and means for closing said aperture upon the insertion of the light, the globe having a ventilating aperture adjacent but separate from said support and a second ventilating aperture on the opposite side of the globe, for the purpose described.

In testimony whereof I have signed my name to this specification, in the presence of two subscribing witnesses, this 5th day of December, 1918.

ARTHUR SCHRENKEISEN.

Witnesses:
 HERMAN F. CUNTZ,
 ALBERT F. MILLER.